United States Patent [19]

Rath

[11] Patent Number: 5,286,823
[45] Date of Patent: Feb. 15, 1994

[54] PREPARATION OF HIGHLY REACTIVE POLYISOBUTENES

[75] Inventor: Hans P. Rath, Gruenstadt, Fed. Rep. of Germany

[73] Assignee: BASF Aktiengesellschaft, Ludwigshafen, Fed. Rep. of Germany

[21] Appl. No.: 902,204

[22] Filed: Jun. 22, 1992

[30] Foreign Application Priority Data

Jun. 22, 1991 [DE] Fed. Rep. of Germany ....... 4120662

[51] Int. Cl.$^5$ .............................. C08F 4/14; C08F 10/10
[52] U.S. Cl. ...................................... 526/237; 526/64; 526/209; 526/210; 526/212; 526/348.7; 585/510; 585/525
[58] Field of Search ............... 526/237, 348.7, 209, 526/210, 212; 585/510, 525

[56] References Cited

U.S. PATENT DOCUMENTS

| | | | |
|---|---|---|---|
| 3,024,226 | 3/1962 | Nolan et al. | 260/94.8 |
| 3,166,546 | 1/1965 | Nolan et al. | 260/94.8 |
| 4,152,499 | 5/1979 | Boerzel et al. | 526/237 X |
| 4,227,027 | 10/1980 | Booth et al. | 585/465 |
| 5,068,490 | 11/1991 | Eaton | 585/525 |

FOREIGN PATENT DOCUMENTS

| | | |
|---|---|---|
| 0145235 | 6/1985 | European Pat. Off. . |
| 0400905 | 12/1990 | European Pat. Off. ............ 526/221 |
| 2702604 | 7/1978 | Fed. Rep. of Germany . |

OTHER PUBLICATIONS

Polyisobutylen und Isobutylen-Mischpolymerisate; pp. 77-104; H. Guterbock Springer, Berlin 1958.
Symposium No. 56, 191 (1976); Puskas et al., J. Polymer Sci.

Primary Examiner—Fred Teskin
Attorney, Agent, or Firm—Keil & Weinkauf

[57] ABSTRACT

A process for preparing highly reactive polyisobutenes with a content of terminal vinylidene groups of more than 80 mol % and an average molecular weight of 500-5000 Dalton by the cationic polymerization of isobutene or isobutene-containing hydrocarbon feeds in liquid phase with the aid of boron trifluoride as catalyst and at from 0° C. to −60° C., comprises polymerizing in the presence of secondary alcohols with 3-20 carbon atoms and/or ethers with 2-20 carbon atoms.

1 Claim, No Drawings

PREPARATION OF HIGHLY REACTIVE POLYISOBUTENES

The present invention relates to a process for preparing highly reactive polyisobutenes with a content of terminal vinylidene groups of more than 80 mol % and an average molecular weight of 500–5000 Dalton by the cationic polymerization of isobutene or isobutene-containing hydrocarbon feeds in liquid phase with the aid of boron trifluoride/alcohol complexes as catalysts and at from 0° C. to −60° C., and polyisobutenes with an average molecular weight of 500–5000 Dalton and a content of terminal vinylidene groups of more than 90 mol %.

High molecular weight polyisobutenes with molecular weights up to several 100,000 Dalton have been known for a long time and the preparation thereof is described, for example, in H. Güterbock: Polyisobutylen und Mischpolymerisate, pages 77–104, Springer, Berlin 1959. The polyisobutenes of this molecular weight range currently available are usually prepared with the aid of Lewis acid catalysts, such as aluminum chloride, alkylaluminum chlorides or boron trifluoride, and usually have less than 10 mol % of terminal double bonds (vinylidene groups) and a molecular weight distribution (dispersity) of 2–5.

Highly reactive polyisobutenes must be distinguished from these conventional polyisobutenes, the former usually having average molecular weights of 500–5000 Dalton and a high content of terminal vinylidene groups of, preferably, distinctly more than 60 mol %. Such highly reactive polyisobutenes are used as intermediates in the preparation of additives for lubricants and fuels as are described, for example, in DE-A 27 02 604. To prepare these additives, initially the terminal double bonds of the polyisobutene are reacted with maleic anhydride to produce polyisobutene/maleic anhydride adducts, especially polyisobuteneylsuccinic anhydrides, which are subsequently reacted with certain amines to give the finished additive. Since it is mainly the terminal vinylidene groups which react with maleic anhydride in the adduct formation, whereas the double bonds located further towards the interior of the macromolecules do not react, or react to a distinctly smaller extent, depending on their position in the macromolecule, without the addition of halogens, the content of terminal vinylidene groups in the molecule is the most important criterion of quality of this polyisobutene type.

The ideas about the generation of the terminal vinylidene groups and the isomerization of the terminal double bonds in the isobutene macromolecules to internal double bonds are, according to Puskas et al., J. Polymer Sci.: Symposium No. 56 (1976) 191, as shown in the following diagram:

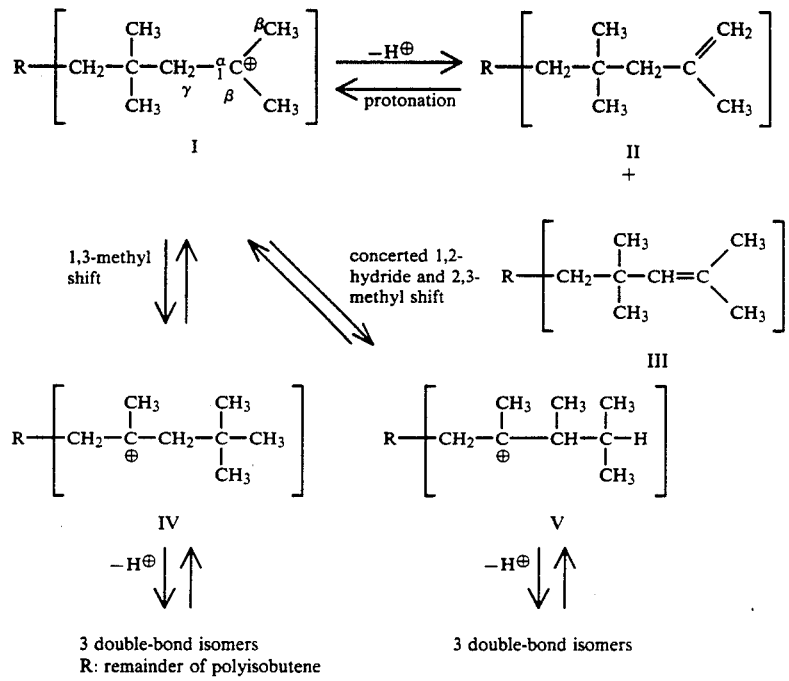

3 double-bond isomers
R: remainder of polyisobutene 3 double-bond isomers

The polyisobutene cation I which is produced during the polymerization reaction can eliminate a proton to give the relevant polyisobutene. This proton can be eliminated either from one of the β-methyl groups or from the internal γ-methylene group. Depending on which of these two positions the proton is eliminated from, the result is a polyisobutene with a terminal vinylidene group II or with a trisubstituted double bond III located near the end of the molecule.

The polyisobutene cation I is relatively unstable and attempts to stabilize itself by rearrangement to more highly substituted cations. This means either 1,3-methyl shifts to give the polyisobutene cation IV or else successive or concerted 1,2-hydride and 2,3-methyl shifts to give the polyisobutene cation V. The cations IV and V may, depending on the position form which the proton is eliminated, produce in each case three different polyisobutenes which are double-bond isomers. However, there is also the possibility of further rearrangement of the cations IV and V, the effect of which is that the double bond migrates even further into the interior of the polyisobutene macromolecule.

All these deprotonations and rearrangements are equilibrium reactions and are thus reversible, although in the final analysis the formation of more stable, more highly substituted cations and thus the formation of polyisobutenes with internal double bonds, with establishment of thermodynamic equilibrium, is preferred. These deprotonations, protonations and rearrangements are catalyzed by traces of acid which may be present in the reaction mixture, but especially by the Lewis acid which is required for catalyzing the polymerization. Because of these facts and since only polyisobutenes with terminal vinylidene groups of the formula II react very well with maleic anhydride to form adducts, even polyisobutenes of the formula III have, by comparison, a distinctly reduced reactivity, and other polyisobutenes with more highly substituted double bonds are virtually unreactive with maleic anhydride, it is understandable why many research groups have made continuing efforts to find improved processes for preparing highly reactive polyisobutenes or polyisobutenes with increasingly high contents of terminal double bonds.

According to DE-A 27 02 604, reactive polyisobutenes with up to 88% by weight of terminal double bonds can be obtained by the polymerization of isobutene catalyzed by boron trifluoride at from −50° to +30° C. and with contact times of less than 10 minutes. A lower value than 1.8 for the dispersity of the polyisobutenes prepared in this way is not found.

Polyisobutenes with similarly high contents of terminal double bonds, but with a narrower molecular weight distribution, can be prepared by the process of EP-A 145 235, by polymerizing isobutene in the presence of a preformed complex of boron trifluoride and a primary alcohol at from −100° to +50° C. and with a contact time for the polymerization reaction of more than 8 minutes, the required molar ratio of boron trifluoride to alcohol being from 0.5:1 to 5:1. The disadvantages of this process are that polyisobutenes with a content of terminal double bonds above 80% can be obtained only at the expense of a low isobutene conversion, and the polyisobutenes obtained in this way have only a low average molecular weight.

Polyisobutenes with a content of up to 95 mole percent of terminal double bonds are said to be obtainable by the gas-phase process of US-A 3 166 546 and the process of US-A 3 024 226 by using a mixture of boron trifluoride and sulfur dioxide gases as catalyst. These polyisobutenes are characterized on the basis of the infrared spectroscopy results. Examination of the polyisobutenes prepared by this process using the method of $^{13}$C NMR spectroscopy, which was not widely used when this patent was written and is considerably more specific and accurate for determining terminal double bonds, showed a maximum content of only 40 mol % of terminal double bonds, however.

US-A 4 227 027 discloses alkyl-transfer reactions catalyzed by boron trifluoride, the catalysts used being adducts of boron trifluoride and diols or polyols at from 40° to 120° C. When this process was applied to the polymerization of isobutene using a boron trifluoride/1,2-butanediol adduct as catalyst, the only product was diisobutylene. Polyisobutene was not formed.

The other quality criteria for polyisobutenes intended for the said use are their average molecular weight and the molecular weight distribution, also called dispersity, of the macromolecules contained in the polyisobutene. In general, polyisobutenes with average molecular weights ($M_n$) of 500–5000 Dalton are used as intermediates for the preparation of the said lubricant and fuel additives. However, polyisobutenes with molecular weights of 800–3000, in particular of 1000–2500, Dalton are preferred for this purpose because of their better effectiveness.

The polymerization of isobutene results in products whose polyisobutene components, ie. the macromolecules, have a random molecular weight distribution which varies in width, with the consequence that as the width of the molecular weight distribution of these polyisobutenes increases they contain increasing amounts of macromolecules with relatively low or relatively high molecular weights, which are more or less unsuitable, because relatively ineffective, for the said purpose. There is thus a desire to prepare highly reactive isobutenes with average molecular weights which are in the preferred molecular weight ranges, and the molecular weight distribution thereof should preferably be as narrow as possible in order to diminish the content of unwanted relatively low or high molecular weight polyisobutenes in the product and thus improve its quality.

It is an object of the present invention to find a process for polymerizing isobutene to polyisobutene with an average molecular weight of 500–5000 and with a content of terminal double bonds of more than 80 mol %, in particular more than 90 mol %, and a narrow molecular weight distribution, which makes it possible economically to prepare these polyisobutenes with high selectivity and with high isobutene conversions. It is also an object to provide highly reactive polyisobutenes with a content of terminal double bonds of more than 90 mol %, whose average molecular weight ought to be in the range 100–2500 Dalton and whose dispersity value ought to be below 2.

We have found that this object is achieved by a process for preparing highly reactive polyisobutenes with a content of terminal vinylidene groups of more than 80 mol % and an average molecular weight of 500–5000 Dalton by the cationic polymerization of isobutene or isobutene-containing hydrocarbon feeds in liquid phase with the aid of boron trifluoride as catalyst and at from 0° C. to −60° C., which comprises polymerizing in the presence of secondary alcohols with 3–20 carbon atoms and/or ethers with 2–20 carbon atoms.

We have also found polyisobutenes with an average molecular weight of 500–5000 Dalton and a content of terminal vinylidene groups of more than 90 mol %, obtainable by the cationic polymerization of isobutene or isobutene-containing hydrocarbon feeds at from −10 to −60° C., with an isobutene conversion of less than 95% and in the presence of a catalyst composed of a preformed complex of boron trifluoride and a secondary alcohol with 3–20 carbon atoms, whose boron trifluoride/secondary alcohol molar ratio is 0.5–0.7 and/or in the presence of dialkyl ethers with 2–20 carbon atoms or the corresponding boron trifluoride/dialkyl ether complexes.

Terminal vinylidene groups or terminal double bonds mean in the sense of the present application those double bonds whose position in the polyisobutene molecule is described by the formula IIa

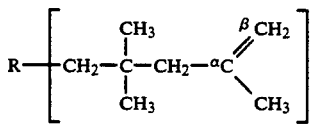

where R is the relevant polyisobutylene radical. The nature and the content of the double bonds present in the polyisobutene prepared according to the invention are determined by $^{13}C$ NMR spectroscopy, where the two carbon atoms of the terminal double bond which are labeled with $\alpha$ and $\beta$ in formula IIa can be identified in the $^{13}C$ NMR spectrum by their signals at chemical shifts of 114.4 and 143.6 ppm respectively, an the content of terminal double bonds related to other types of double bonds can be calculated by determining the peak areas for the signals and relating them to the total integral for the olefin signals.

In this application, the average molecular weight means the number average $M_n$ of the molecular weight, which can be determined, for example, by gel permeation chromatography, by ozonolysis or by vapor pressure osmometry.

It is possible with the process according to the invention to prepare polyisobutenes with a content of more than 80 mol %, in particular of more than 90 mol %, of terminal vinylidene groups by the cationic polymerization of isobutene in liquid phase at from 0° to −60° C., preferably from −4° to −30° C. and particularly preferably at from −10° to −20° C., polymerizing with boron trifluoride in the presence of secondary alcohols and/or dialkyl ethers.

Since the properties of boron trifluoride as polymerization catalyst are greatly modified by complex formation with the secondary schools, this alteration in the catalyst properties is also directly influenced by the ratios of the amounts of boron trifluoride and secondary alcohol and since, in addition, this modification of the catalyst properties has a crucial effect on the quality of the polyisobutene produced therewith, especially its content of terminal double bonds, these secondary alcohols are also called cocatalysts hereinafter.

Suitable secondary alcohols for this purpose are virtually all secondary alcohols with 3–20 carbon atoms, ie. the secondary alcohols can be straight-chain or branched. Boron trifluoride complexes with long-chain alcohols with 10 or more carbon atoms have the advantage that they are more soluble in the polymerization medium than are boron trifluoride complexes with short-chain secondary alcohols such as isopropanol or 2-butanol. On the other hand, short-chain secondary alcohols can be obtained at low cost and in large quantities on the free market, whereas some long-chain secondary alcohols would need to be synthesized specifically for their use as cocatalyst in the process according to the invention, for example by the addition, catalyzed by Brönstedt acids, of water onto the relative alkenes. It is, of course, also possible to use secondary alcohols with more than 20 carbon atoms in the process according to the invention, but the utilizability thereof is restricted by their low availability.

Examples of suitable secondary alcohols are the following: ispropanol, 2-butanol, sec-pentanols, sec-hexanols, sec-heptanols, sec-octanols, sec-nonanols, sec-decanols, sec-tridecanols, sec-hexadecanols and sec-eicosanols.

Apart from monohydric secondary alcohols, it is also possible to use polyhydric secondary alcohols according to the invention.

The boron trifluoride/secondary alcohol complexes are expediently prepared by passing gaseous boron trifluoride into the relevant alcohol or, preferably, into a solution of the relevant alcohol in a solvent. These complexes are usually prepared at from −60° to +40° C., preferably at from −20° to +40° C. It is likewise possible to use lower temperatures, but these are more costly to produce industrially. The formation of the boron trifluoride/secondary alcohol complex is exothermic, which is why the reaction mixture is advantageously cooled to keep it at the required temperature.

At low temperatures, many complexes of boron trifluoride with secondary alcohols are highly viscous liquids or even, like the complexes with polyhydric secondary alcohols, solids. In such cases it is advantageous to form the boron trifluoride complexes in a solvent. Examples of suitable solvents are hydrocarbons such as pentane, hexane, isooctane or halohydrocarbons such as methylene chloride or chloroform. It is, of course, also possible to use mixtures of solvents. It is generally true that solvents of higher polarity dissolve the boron trifluoride/secondary alcohol complexes better.

Thus, when boron trifluoride/secondary alcohol complexes are formed in non-polar solvents, such as the abovementioned hydrocarbons or a polyisobutene solution, the complex may separate out, owing to the solubility product having been exceeded, with the formation of any emulsion or suspension. Since the process according to the invention is catalyzed by the complexes either dissolved homogeneously in the reaction medium or dispersed heterogeneously therein, separating out of the catalyst is not usually critical. However, because short-chain, polar, secondary alcohols are more easily available, the process according to the invention is normally carried out with heterogeneous catalysis.

The boron trifluoride/secondary alcohol complexes can be preformed in separate reactors, then stored until used in the process according to the invention and metered into the polymerization apparatus as required.

To store the solutions of preformed boron trifluoride/secondary alcohol complexes they are, where appropriate after dilution with further solvent, expediently dispensed into coolable containers and stored generally below 0° C. until used.

Another, preferred variant comprises forming the boron trifluoride/secondary alcohol complexes in situ in the polymerization apparatus. In this procedure, the relevant secondary alcohol is fed, with or without a solvent and with the isobutene, into the polymerization apparatus, and boron trifluoride is dispersed in the required amount in this mixture, where it reacts with the alcohol to give the boron trifluoride/secondary alcohol complex. In place of an additional solvent, it is possible and advantageous in the in situ formation of the catalyst complex to use isobutene or the reaction mixture of unreacted isobutene and polyisobutene as solvent. If the reaction mixture of polyisobutene-containing isobutene is used as solvent, the isobutene is of course not usually completely reacted, and the isobutene conversions is expediently about 70% for example.

The in situ preparation of the boron trifluoride/secondary alcohol complexes for the preparation of highly reactive polyisobutenes represents a significant simplification of the process for the preparation thereof, mention being made here only of the reduced apparatus costs, because there is no longer a need for reactors for preparing preformed complexes or storage tanks for the preformed complex solutions, and of the impossibility to date, when boron trifluoride complexes with primary alcohols are used for preparing highly reactive polyisobutene, of avoiding double-bond shifts to a considerable extent which distinctly reduces the quality of the product. The reason for this advantageous behavior of the cocatalysts according to the invention is unknown.

The catalysts are expediently prepared with the molar ratio of boron trifluoride and secondary alcohol which they are to have in the process according to the invention, ie. the boron trifluoride/secondary alcohol molar ratio is normally not changed after the complex has been formed.

The boron trifluoride/monohydric secondary alcohol molar ratio in the catalysts which can be used according to the invention is generally 0.5–0.9, preferably 0.55–0.7, ie. more than the stoichiometric amount of alcohol is employed. If the reaction system contains other substances able to form complexes with boron trifluoride, it usually proves advantageous to saturate the reaction system with boron trifluoride so that the stated boron trifluoride/secondary alcohol molar ratios are obtained despite the possible occurrence of competing complex formation of the boron trifluoride with these substances. It is not known to what extent and in what manner all the alcohol molecules are bond to the boron compound in the complex formation, but the use of an apparent excess of alcohol is critical for the result of the process according to the invention, and even when a 1:1 complex of boron trifluoride and monohydric secondary alcohol is used there is a considerable level of double-bond migration in the polyisobutene produced in the process according to the invention.

It is expedient to use gaseous boron trifluoride for preparing the boron trifluoride/secondary alcohol complexes which can be used according to the invention, and it is possible to use the technical product which still contains small amounts of sulfur dioxide (purity: 96.5% by weight), but high-purity boron trifluoride (purity: 99.5% by weight) is preferred. However, boron trifluoride complexes which form the required complexes in the presence of secondary alcohols, with liberation of the original complex ligand, can also be used as source of boron trifluoride. Moisture should be substantially excluded from all the preparation processes and, where appropriate, during storage of the boron trifluoride/secondary alcohol complexes, because otherwise there may be formation of boron trifluoride/water adducts.

When boron trifluoride complexes are formed with complexing agents other than secondary alcohols, for example with primary alcohols or with ethers, addition of secondary alcohols to these complexing agents leads to the formation of boron trifluoride complex catalysts which, when used in the process according to the invention for preparing polyisobutene, have selectivities better than those of catalysts prepared without the addition of secondary alcohols.

In some cases, the different complex ligands may have synergistic effects when mixed boron trifluoride complex catalysts prepared therefrom are used in the process according to the invention, and may have a beneficial effect on the properties of the product. This particularly applies when dialkyl ethers are used as coligands.

Possible dialkyl ether coligands are $C_2$–$C_{20}$-dialkyl ethers, preferably $C_6$–$C_{10}$-dialkyl ethers, it being possible to use both symmetrical and unsymmetrical dialkyl ethers. Particularly preferred dialkyl ethers contain at least one tertiary alkyl group.

Mixed boron trifluoride complex catalysts composed of boron trifluoride, secondary alcohol and dialkyl ether can be formed in a variety of ways, for example by mixing solutions of preformed boron trifluoride/secondary alcohol complexes and boron trifluoride/dialkyl ether complexes. An alternative preparation of mixed complexes is by, for example, passing boron trifluoride into secondary alcohol/dialkyl ether mixtures. Mixed complexes can also be obtained by adding a secondary alcohol or a dialkyl ether to a preformed boron trifluoride/secondary alcohol or boron trifluoride/dialkyl ether complex respectively.

The chemical nature of these mixed boron trifluoride/secondary alcohol/dialkyl ether complexes is still unclear. It is as yet unknown whether these mixed complexes comprise merely mixtures of separate boron trifluoride/secondary alcohol and dialkyl ether complexes, whether different ligands are bound to one boron trifluoride molecule or whether there is a sort of equilibrium between these forms. It is likewise still unknown how the different complex ligands bring about the synergistic effect when the mixed complexes are used in the process according to the invention.

The mixed boron trifluoride/secondary alcohol/dialkyl ether complex catalysts can contain the secondary alcohol and dialkyl ether ligands in virtually any ratio of amounts. However, ratios of 1–20 mol of secondary alcohol per mol of dialkyl ether are particularly advantageous, especially ratios of 5–10. It should be noted in this connection that the optimal secondary alcohol/dialkyl ether ratio also depends on the nature of the secondary alcohols and dialkyl ethers used in each case.

It is also possible in the process according to the invention to replace the secondary alcohols completely by dialkyl ethers virtually without disadvantages if the dialkyl ethers have at least one tertiary alkyl group in the molecule. Particularly advantageous dialkyl ethers are those in which the tertiary carbon atom of the alkyl group is directly bonded to the oxygen atom. Examples of tertiary alkyl groups are tert-butyl, tert-amyl and isooctyl (2,4,4-trimethyl-2-pentanyl). Preferably used are methyl tert-butyl ether, ethyl tert-butyl ether, n-propyl tert-butyl ether, isopropyl tert-butyl ether, n-butyl tert-butyl ether, methyl tert-amyl ether, ethyl tert-amyl ether, methyl isooctyl ether and ethyl isooctyl ether. These ethers can be obtained by, for example, adding the relevant alcohols onto the appropriate isoalkenes. The dialkyl ethers are generally used in an amount of 1–100 mmol, preferably 1–10 mmol, per 1 of reaction mixture. Where the dialkyl ethers are used as the sole ligand they can be employed in the same molar ratios with respect to the boron trifluoride as indicated for the secondary alcohols. However, when these ethers are used alone the molar ratio to boron trifluoride can be up to 1:1.

Thus, to prepare highly reactive polyisobutenes according to the invention, the preformed boron trifluoride/secondary alcohol and/or dialkyl ether complex solution or suspension is dispersed, in accordance with the amount of catalyst required, in isobutenes or, alternatively, the catalyst is formed in situ in the isobutene stream containing secondary alcohol and dialkyl ether by passing in gaseous boron trifluoride. It is possible to use as isobutene feedstock in the process according to the invention either pure isobutene or mixtures of isobutene with other hydrocarbons, whose isobutene content is expediently not below 5% by weight. Hydrocarbon mixtures of a high isobutene content and a low butadiene content are preferably used, but a pure isobutene feedstock is particularly preferred. The latter can be converted as such into polyisobutene in the presence of inert solvents such as saturated hydrocarbons, for example butane, pentane, hexane, isooctane or cyclohexane, halohydrocarbons such as methylene chloride or chloroform, or halocarbons with suitable melting and boiling points, using the catalyst system according to the invention. The isobutene feedstock can contain small amounts of contaminants such as water, carboxylic acids or mineral acids without critical losses of yield or selectivity in the polymerization. However, it is expedient and advantageous to avoid accumulation of these impurities in the system by removing such contaminants from the isobutene-containing feedstock, for example by adsorption on solid adsorbents such as active carbon, molecular sieves or ion exchangers.

The isobutene polymerization can be carried out batchwise, semicontinously or continuously using conventional reactors such as tubular reactors, tube bundle reactors or stirred vessels. The process according to the invention is preferably carried out in a loop reactor, ie. a tubular or tube bundle reactor with continuous circulation of the reaction material, it usually being possible to vary intake to circulation ratios from 1:1 to 1:1000, preferably from 1:50 to 1:200, v/v. It is self-evident that the intake amount is equal to the amount discharged after the polymerization reaction has reached equilibrium.

To avoid high local and stationary catalyst concentrations in the polymerization apparatus, which might cause double-bond shifts, it is expedient to ensure thorough mixing of all the reactants a soon as they enter the reactor, both when preformed catalyst complexes are passed into a reactor and when the boron trifluoride complexes are prepared in situ in the reactor. It is also expedient to generate turbulence of the reaction material in the reactor, for which purpose the reactor is equipped, for example, with suitable fittings, such as deflector plates, or the cross-sectional dimensions of the tubes can be such that the flow rate is suitable.

The residence time of the polymerizing isobutene in the reactor can be from 5 sec to several hours, and is preferably from 1 to 30 and particularly preferably from 2 to 20 minutes. The overall reaction rate depends on the amount, but especially on the molar ratio, of the catalyst used. The boron trifluoride/secondary alcohol and/or dialkyl ether catalyst is normally introduced in amounts of 0.05–1% of the weight of the isobutene or isobutene/hydrocarbon mixture used.

The polymerization is expediently carried out below 0° C. Although isobutene can still be successfully polymerized to highly reactive polyisobutene at considerably lower temperatures, this is preferably done at from −4° to −60° C., in particular from −4° to −30° C. and particularly preferably from −10° to −20° C. The polymerization is generally carried out under atmospheric pressure, although it is likewise possible to use elevated pressure, in particular the autogenous pressure of the reaction system, but this usually has no effect on the polymerization result. The polymerization is advantageously carried out under isothermal conditions with a constant stationary monomer concentration in the reaction medium. The stationary isobutene concentration is, in principle, arbitrary but usually expedient is a monomer concentration of 0.2–50, preferably 0.2–5, % of the total weight of the polymerization mixture.

Since the polymerization is an exothermic reaction, the heat of polymerization is usually removed with a cooling device which can be operated, for example, with liquid ammonia as coolant. Another possibility for removing the heat of polymerization is by evaporative cooling. This entails the heat which is evolved being used to evaporate the isobutene and/or other volatile components of the isobutene feedstock or of the volatile solvents such as ethane, propane or butane, which keeps the temperature constant.

The isobutene conversion is, in principle, arbitrary. However, it is self-evident that very low isobutene conversions cast doubt on the economics of the process, whereas the risk of double-bond shifts increases at very high isobutene conversions exceeding 99%. For these reasons, the isobutene conversion is normally from 20 to 99%, particularly preferably from 90 to 98%. Surprisingly, at these high isobutene conversions with the catalyst system according to the invention the extent of double-bond migration is low, and the resulting polymer still contains more than 80 mol % of terminal vinylidene groups. To produce polyisobutene with more than 90 mol % of terminal double bonds, the isobutene conversion is expediently up to 95%, preferably from 50 to 95, in particular from 70 to 95 and particularly preferably from 80 to 95%.

The high selectivity for polyisobutenes with terminal vinylidene groups while the isobutene conversion is high is a great advantage of the process according to the invention, which has a particularly beneficial effect when isobutene feedstocks which contain isobutene in addition to other hydrocarbons only in relatively small amounts, for example raffinate I, are used. Since isolation of unreacted isobutene is not economic with such feedstocks, and it therefore cannot be returned to the polymerization, low isobutene conversions with these feedstocks are virtually synonymous with losses of yield.

As already mentioned, the catalysts used in the process according to the invention are boron trifluoride/secondary alcohol complexes in which the molar ratio of boron trifluoride to secondary alcohol is 0.5–0.9, preferably 0.55–0.7. To prepare polyisobutenes with a maximum content of terminal double bonds, it is preferable to use boron trifluoride/secondary alcohol and/or dialkyl ether complexes which contain the secondary alcohol or the dialkyl ether in a large excess relative to the boron trifluoride. For example, to prepare polyisobutenes with more than 90 mol % of terminal vinylidene groups, complexes of boron trifluoride and monohydric secondary alcohols and/or dialkyl ethers with molar ratios of 0.5–0.7 are preferred.

For working up, the discharge from the reaction is expediently passed into a medium which inactivates the polymerization catalyst and thus stops the polymerization. It is possible to use for this purpose, for example, water, alcohols, acetonitrile, ammonia or aqueous solutions of mineral bases, such as alkali metal and alkaline earth metal hydroxide solutions, solutions of carbonates of these metals and the like.

The working up subsequently entails the polyisobutene expediently being extracted several times to remove residual catalyst, normally by washing with methanol or water, and then being distilled to give unreacted isobutene, solvent, oligomers and polyisobutene. The isobutene, the solvent and the oligomers can be returned to the polymerization apparatus and reacted again. The required polyisobutene can be drawn off as bottom product from the distillation column.

The process according to the invention makes it possible to prepare economically highly reactive polyisobutenes whose contents of terminal double bonds are above 80 mol %, and even above 90 mol % in particular embodiments of the process, with very good selectivities and very high conversions, and, moreover, gives polyisobutenes in the preferred molecular weight range with narrow molecular weight distributions.

EXAMPLES

The average molecular weights ($M_n$) of the polymers prepared in the Examples were determined by gel permeation chromatography, using standardized polyisobutenes for calibration. The number average $M_n$ was calculated from the resulting chromatograms using the equation $$M_n = \frac{\Sigma c_i}{\Sigma \frac{c_i}{M_i}}$$

where $c_i$ is the concentration of the single polymer species i in the resulting polymer mixture, and $M_i$ is the molecular weight of the single polymer species i. The molecular weight distribution, called the dispersity D hereinafter, was calculated from the ratios of the weight average molecular weight ($M_w$) and number average molecular weight ($M_n$) by the equation $$\frac{M_w}{M_n} = 0$$

The weight average $M_w$ was determined from the resulting chromatograms using the formula $$M_w = \frac{\Sigma c_i M_i}{\Sigma c_i}$$

The content of terminal vinylidene groups was determined by $^{13}C$ NMR spectroscopy, using deuterated chloroform as solvent and tetramethylsilane as standard.

EXAMPLE 1

Over the course of one hour, 600 g of a low-butadiene C₄ cut 37 mmol of 2-butanol and 22 mmol of boron trifluoride were passed to the intake side of a loop reactor which as equipped with an integrated circulating pump and had a tube diameter of 10 mm and a volume of 100 ml. The polyisobutene formed in the reactor was discharged through an outlet device which was located 2 cm in front of the inlet device for the starting materials.

The composition of the C₄ cut was as follows:
4.0% by weight isobutane,
9.2% by weight n-butane,
29.0% by weight 1-butene
7.7% by weight trans-2-butene
4.5% by weight cis-2-butene
45.4% by weight isobutene
less than 50 ppm butadiene
about 2 ppm water.

The reactor was cooled so that the reaction medium was at −13° C. The isobutene conversion was 61%, and the average residence time was 6.6 minutes.

The discharge from the reaction was continuously mixed with 100 m/h of 10% by weight sodium hydroxide solution in a stirred container to stop the polymerization, and the remaining liquid gas was evaporated at 40° C. The liquid gas was drawn off, condensed at −80° C., weighed and examined for isobutene by gas chromatography. The discharge from the reaction was collected from 2 hours after equilibration of the reactor for sampling purposes, one sample being composed of the discharge collected during one hour. The resulting degassed product was dissolved in 150 g of hexane and extracted three times with 100 ml of water each time. The organic phase was then distilled. The required polyisobutene remained as residue in the rotary evaporator at 240° C. under 2 mbar. The resulting polyisobutene had an average molecular weight ($M_n$) of 2136 Dalton, and its dispersity value was 1.8. Evaluation of the $^{13}C$ NMR spectrum showed a content of 81 mol % of terminal double bonds.

EXAMPLE 2

350 g of pure isobutene, 200 g of hexane, 50 mmol of 2-butanol and 31 mmol of boron trifluoride were passed into the polymerization reactor at −10° C. in a similar manner to Example 1, ie., the catalyst was formed in situ.

The isobutene conversion was 90% at an average residence time of 8.4 minutes. The yield of polyisobutene after working up and distillation was 94.5% based on reacted isobutene. The average molecular weight ($M_n$) of the polyisobutene prepared in this way was 1250 Dalton, and its dispersity value was found to be 1.6. The content of terminal double bonds was 85 mol %.

EXAMPLE 3

The same amounts of feedstock as in Example 2 were used, but in this case a preformed boron trifluoride/2-butanol complex was added as catalyst. The complex had been prepared by passing gaseous boron trifluoride into a 1 molar solution of 2-butanol in a mixture of 80% by volume hexane and 20% by volume methylene chloride at −15° C. The polymerization was carried out at −14° C. The average residence time was 8 minutes. The isobutene conversion was 90% and the yield of polyisobutene was 95.7% based on reacted isobutene. The average molecular weight ($M_n$) of the polyisobutene obtained in this way was 1450 Dalton with a dispersity of 1.7. The content of terminal double bonds was 91 mol %.

EXAMPLE 4

The polymerization was carried out in a similar manner to Example 2, but the catalyst was formed in situ from 56 mmol of isopropanol and 47 mmol of boron trifluoride. With the reactor at −10° C., the isobutene conversion was 89% and the yield of polyisobutene was 83.9% based on reacted isobutene, the average molecular weight ($M_n$) was 840 Dalton and the dispersity value was 1.3. The content of terminal double bonds in the polymer was 85 mol %.

EXAMPLE 5

The polymerization was carried out in a similar manner to Example 3 but a preformed complex with a boron trifluoride/ispropanol molar ratio of 0.6 was used as catalyst. The complex had been prepared by reacting corresponding amounts of isopropanol with gaseous boron trifluoride without diluent at −15° C. and subsequently diluting with a mixture of methylene chloride and n-hexane in the ratio 1:1 v/v so that the total isopropanol concentration in the solution was 1 molar. At an isobutene input of 450 g/h, a hexane input of 200 g/h and an input of 35 ml/h of catalyst solution, a sample of the discharge from the reactor was taken and worked up as described in Example 1 8 h after the reaction had reached equilibrium, ie. after the conversion had become constant at a constant reactor temperature and constant acid number of the discharge. With the reactor at 31 11° C. and an average residence time of 6 minutes, the isobutene conversion was 86% an the polyisobutene yield was 91.7% based on reacted isobutene. The resulting polyisobutene had an average molecular weight ($M_n$) of 1290 Dalton, and its dispersity value was 1.6. The content of terminal double bonds was 95 mol %.

EXAMPLE 6

250 g of isobutene and 250 g of n-hexane were passed each hour into the loop reactor of Example 1. 20 mmol of boron trifluoride, 21 mmol of 2-butyl tert-butyl ether and 10 mmol of a boron trifluoride/2-butanol complex (equivalent ratio: 0.6) were metered into the hexane supply line. With the reaction solution at −12° C., the same amount of polymer solution was discharged each hour after the reaction system had reached equilibrium.

The polymer solution was worked up and analyzed as in Example 1. With an isobutene conversion of 85%, the resulting polyisobutene had an average molecular weight $M_n$ of 1065, a dispersity of 1.9 and a content of terminal double bonds of 92 mol % in a yield of 90.4%.

EXAMPLE 7

The process was carried out as in Example 6, but 25 mmol of a boron trifluoride/2-butanol complex (equivalent ratio: 0.7), 10 mmol of boron trifluoride and 4 mmol of 2-butyl tert-butyl ether were metered in as catalyst.

At an isobutene conversion of 91%, the resulting polyisobutene had an average molecular weight $M_n$ of 930, contained 95 mol % of terminal double bonds and was obtained in a yield of 87%.

EXAMPLE 8

The process was carried out as in Example 6, but di-n-butyl ether was used. Isobutene conversion 76%; $M_n$: 990; terminal double bonds: 80 mol %.

COMPARATIVE EXAMPLE

Polyisobutene was prepared as described in Example V of US-A 30 24 226. The investigations of the polyisobutene obtained by this process by means of infrared (IR) spectroscopy gave the impression that almost exclusively terminal double bonds were present, which is attributable to the fact that the extinction of the IR absorption of the non-terminal double bonds is very much lower than that of the terminal double bonds. When $^{13}C$ NMR spectroscopy was used, this polyisobutene was found to have a content of only 40 mol % of terminal double bonds. On the basis of the chemical shifts of their $^{13}C$ signals, the remaining double bonds were located in the interior of the macromolecules. However, it was not possible to assign them exact positions in the macromolecules.

We claim:

1. A process for preparing highly reactive polyisobutenes having a content of terminal vinylidene groups of more than 80 mol % and an average molecular weight of 500–5000 Dalton which comprises:
   cationically polymerizing isobutene or an isobutene-containing hydrocarbon feed in the liquid phase in a polymerization apparatus at a temperature of from 0° to −60° C. in the presence of boron trifluoride as a catalyst and in the presence of a secondary alcohol having from 3–20 carbon atoms, wherein the mixing of boron trifluoride and the secondary alcohol in said polymerization apparatus generates boron trifluoride/secondary alcohol complexes in situ in the polymerization mixture, and thereafter working up the polymerization mixture.

* * * * *